United States Patent [19]
Shibata et al.

[11] Patent Number: 5,432,136
[45] Date of Patent: Jul. 11, 1995

[54] DIELECTRIC CERAMIC COMPOSITIONS

[75] Inventors: Masamitsu Shibata; Yukio Hamaji, both of Nagaokakyo, Japan

[73] Assignee: Murata Manufacturing Co., Ltd.

[21] Appl. No.: 278,620

[22] Filed: Jul. 21, 1994

[30] Foreign Application Priority Data

Jul. 26, 1993 [JP] Japan .................. 5-204625
Jul. 26, 1993 [JP] Japan .................. 5-204627
Sep. 1, 1993 [JP] Japan .................. 5-217519

[51] Int. Cl.$^6$ ............................................ C04B 35/46
[52] U.S. Cl. ................................................ 501/138
[58] Field of Search ........................................ 501/138

[56] References Cited

U.S. PATENT DOCUMENTS 4,988,650  1/1991  Takagi et al. .................. 501/138

FOREIGN PATENT DOCUMENTS 0534802  3/1993  European Pat. Off. ...... C04B 35/46

*Primary Examiner*—David Brunsman
*Attorney, Agent, or Firm*—Ostrolenk, Faber, Gerb & Soffen

[57] ABSTRACT

The present invention is directed to a dielectric ceramic composition composed of, 97.5 to 99.95 wt. % of main component represented by, $\{100-(a+b+c+d)\}$ $(Ba_{100-x}\ Pb_x)\ TiO_3 + aZnO + bBi_2O_3 + cNb_2O_5 + dRe_2O_3$ ($0.5 \leq a \leq 4.5$, $0.5 \leq b \leq 4.5$, $0.5 \leq c \leq 4.5$, $0.5 \leq d \leq 5.5$ and $0 < x \leq 6.0$, and 0.05 to 2.5 wt. % of first by-component consisting of glass whose main component is $SiO_2$. Also, the present invention is directed to a dielectric ceramic composition composed of main component represented by, $\{100-(a+b+c+d+e)\}$ $BaTiO_3 + aZnO + bBi_2O_3 + cMeO_2 + dNb_2O_5 + eRe_2O_3$ ($0.5 \leq a \leq 4.5$, $2.0 \leq b \leq 6.0$, $0.5 \leq c \leq 6.5$, $0.5 \leq d \leq 4.5$ and $0.5 \leq e \leq 5.5$), and first by-component. Furthermore, the present invention is directed to a dielectric ceramic composition composed of main component represented by, $(100-(a+b+c+d+e+f))$ $BaTiO_3 + aZnO + bBi_2O_3 + cNb_2O_5 + dMaO + eMbO_2 + fRe_2O_3$ ($0.5 \leq a \leq 4.5$, $2.0 \leq b \leq 6.0$, $0.5 \leq c \leq 4.5$, $0 < d \leq 4.0$, $6.5 \leq e \leq 10.0$ and $0.5 \leq f \leq 5.5$) and first by-component. The above-mentioned three dielectric ceramic compositions may also be composed of, 97.0 to 99.94 wt. % of main component, 0.05 to 2.5 wt. % of first by-component, and 0.01 to 0.5 wt. % of second by-component consisting of at least one kind of oxides of Cr, Mn, Fe, Co and Ni.

6 Claims, No Drawings

DIELECTRIC CERAMIC COMPOSITIONS

BACKGROUND OF THE INVENTION

1. Field of the Invention

The present invention relates to dielectric ceramic compositions, and particularly to dielectric ceramic compositions used as materials of a ceramic laminated capacitor and the like.

2. Description of the Prior Art

Conventionally, as dielectric ceramic compositions having a small voltage dependency, a high ceramic strength and a flat dielectric temperature characteristic, those composed of, for example, $BaTiO_3$ as a main component, to which bismuth compounds such as $Bi_2O_3$-$TiO_2$-$SnO_2$, $Bi_2O_3$-$ZrO_2$ and rare earth elements are added as by-components, are widely known.

While, separate from the dielectric ceramic compositions having the above-mentioned composition, those composed of $BaTiO_3$ as a main component, to which $Nb_2O_5$, rare earth oxides and transition metal oxides of Cr, Mn, Fe, Co, Ni are added as by-components, have been proposed as the dielectric ceramic composition which has a flat dielectric temperature characteristic, irrespective of its high dielectric constant of 3000 or more.

Temperature characteristics of these dielectric ceramic compositions is that, X7R characteristics of the EIA standards is satisfied, or a capacitive change factor based on an electrostatic capacity at $+25°$ C. in a temperature range of $-55°$ C. to $+125°$ C. is within $\pm 15\%$.

In recent years, ceramic laminated capacitors are used in ECC modules (electronic control devices of an engine) installed in an engine soon of an automobile. Since the device is designed for stable control of the engine, viewing from the temperature stability of circuitries, it is desirable to satisfy the R characteristics (capacitive change factor within $\pm 15\%$) as the temperature characteristics of the capacitors being used.

While, in winter in cold districts, temperature goes down to around $-20°$ C. in the engine room of the automobile, and in summer, the temperature rises to around $+130°$ C. when the engine is started. Particularly, when the engine is over heated, the temperature easily goes up to around $150°$ C. Thus, the conventional dielectric ceramic compositions which satisfy the X7R characteristics can not cope with the high engine room temperature any longer.

Since the laminated capacitors are for use in the automobile, when it breaks, while being mounted on the circuit board, the ECC modules can not function sufficiently, and in the worst case, there is the possibility of causing an accident, which must be avoided by all means. Furthermore, since vibration and stress are always exerted while the automobile is running, in order to avoid damages due to such vibration and stress, the ceramics must be sufficiently strong.

When the voltage dependency of the dielectric ceramic composition is large, the dielectric can not be processed into a thin film, thus the small-sized and large capacity ceramic laminated capacitor can not be manufactured, besides, it is also not preferable from a viewpoint of circuit stability.

Now, in some cases, the dielectric ceramic composition composed of $BaTiO_3$ as a main component, to which $Nb_2O_5$, rare earth compounds and transition metal oxides of Cr, Mn, Fe, Co and Ni are added as by-components, was problematic in that, it is apt to break at the time of mounting to the circuit board because the ceramic strength is weak.

Since the voltage dependency of the dielectric ceramic composition having a large dielectric constant is large, it can not meet with the recent thin-film technique, thus the small-sized and large capacity ceramic laminated capacitor could not be manufactured.

Meanwhile, as stated above, though the dielectric ceramic compositions composed of $BaTiO_3$ as the main component, to which bismuth compounds are added as the by-components, have a small voltage dependency and a high ceramic strength, when the dielectric constant is raised, a temperature change factor of the dielectric constant becomes larger. Also, in the case of ceramic laminated capacitor, when a baking temperature is raised to $1160°$ C. of higher, an internal electrode must contain Pb by 30 wt. % or more. Hence, Pb and $Bi_2O_3$ in the internal electrode apt to react one another, furthermore, a cost of the internal electrode increases.

SUMMARY OF THE INVENTION

It is, therefore, a primary object of the present invention to provide dielectric ceramic compositions, which can be baked at temperature of $1160°$ C. or less and satisfies X8R characteristics irrespective of its high dielectric constant of 1000 or more, that is, when based on an electrostatic capacity at $+25°$ C., the temperature change factor (hereinafter, referred to as "TC") of the electrostatic capacity is flat within JL 15% in a wide temperature range of $-55°$ C. to $+150°$ C., and a mechanical strength of the ceramics is high, furthermore, when the thickness of a dielectric ceramic layer is processed into a thin film of 10 μm to 15 μm, and a d.c. voltage of 25V (50% of the rated voltage of 50V) is applied in accordance with the RB characteristics standard of JIS C6429, the temperature change factor of the electrostatic capacity (hereinafter, referred to as "bias TC") is within $+15\%$ to $40\%$.

A first invention is directed to the dielectric ceramic composition composed of, 97.5 to 99.5 wt. % of main component represented by a general formula $\{100-(a+b+c+d)\}(Ba_{100-x}\ Pb_x)TiO_3+aZnO+bBi_2O_3+cNb_2O_5+dRe_2O_3$ (where, Re is at least one kind selected from La, Pr, Nd, Sm, Dy and Er, a, b, c, d and x designate mol %, $0.5 \leq a \leq 4.5$, $0.5 \leq b \leq 4.5$, $0.5 \leq c \leq 4.5$, $0.5 \leq d \leq 5.5$ and $0 < x \leq 6.0$), and 0.05 to 2.5 wt. % of first by-component consisting of glass whose main component is $SiO_2$.

A second invention is directed to the dielectric ceramic composition composed of, 97.0 to 99.94 wt. % of main component represented by a general formula $(100-(a+b+c+d)\}\ (Ba_{100-x}\ Pb_x)TiO_3+aZnO+bBi_2O_3+cNb_2O_5+dRe_2O_3$ (where, Re is at least one kind selected from La, Pr, Nd, Sm, Dy and Er, a, b, c, d and x designate mol. %, $0.5 \leq a < 4.5$, $0.5 \leq b \leq 4.5$, $0.5 \leq c \leq 4.5$, $0.5 \leq d \leq 5.5$ and $0 < x \leq 6.0$), 0.05 to 2.5 wt. % of first by-component consisting of glass whose main component is $SiO_2$, and 0.01 to 0.5 wt. % of second by-component consisting of at least one kind selected from oxides of Cr, Mn, Fe, Co and Ni.

A third invention is directed to the dielectric ceramic composition composed of, 97.5 to 99.95 wt. % of main component represented by a general formula $(100-(a+b+c+d+e)\}BaTiO_3+aZnO+bBi_2O_3+cMeO_2+dNb_2O_5+eRe_2O_3$ (where, Me is at least one kind selected from Ti, Zr and Sn, Re is at least one kind selected from La, Pr, Nd, Sm, Dy and Er, a, b, c, d and e designate mol. %, $0.5 \leq a \leq 4.5$, $2.0 \leq b \leq 6.0$, $0.5 \leq c \leq 6.5$, $0.5 \leq d \leq 4.5$ and $0.5 \leq e \leq 5.5$), and 0.05 to 2.5 wt. % of first by-component consisting of glass whose main component is $SiO_2$.

A fourth invention is directed to the dielectric ceramic composition composed of, 97.0 to 99.94 wt. % of main component represented by a general formula $\{100-(a+b+c\ d+e)\}$ $BaTiO_3+aZnO+bBi_2O_3+cMeO_2+dNb_2O_5+eRe_2O_3$ (where, Me is at least one kind selected from Ti, Zr and Sn, Re is at least one kind selected from La, Pr, Nd, Sm, Dy and Er, a, b, c, d and e designate mol. %, $0.5 \leq a \leq 4.5$, $2.0 \leq b \leq 6.0$, $0.5 \leq c \leq 6.5$, $0.5 \leq d \leq 4.5$ and $0.5 \leq e \leq 5.5$),0.05 to 2.5 wt. % of first by-component consisting of glass whose main component is SiO2, and 0.01 to 0.5 wt. % of second by-component consisting of at least one kind from oxides of Cr, Mn, Fe, Co and Ni.

A fifth invention is directed to a dielectric ceramic composition composed of, 97.5 to 99.95 wt. % of main component represented by a general formula $(100-(a+b+c+d+e+f)$ $BaTiO_3+aZnO+bBi_2O_3+cNb_2O_5+dMaO+eMbO_2+fRe_2O_3$ (where, Ma is at least one kind selected from Pb and Ca, Mb is at least one kind selected from Ti, Zr and Sn, Re is at least one kind selected from La, Pr, Nd, Sm, Dy and Er, a, b, c, d, e and f designate mol. %, $0.5 \leq a \leq 4.5$, $2.0 \leq b \leq 6.0$, $0.5 \leq c \leq 4.5$, $0 < d \leq 4.0$, $6.5 \leq e \leq 10.0$ and $0.5 \leq f \leq 5.5$), and 0.05 to 2.5 wt. % of first by-component consisting of glass whose main component is $SiO_2$.

A sixth invention is directed to a dielectric ceramic composition composed of, 97.0 to 99.94 wt. % of main component represented by a general formula $(100-(a+b+c+d+e+f)$ $BaTiO_3+aZnO+bBi_2O_3+cNb_2O_5+dMaO+eMbO_2+fRe_2O_3$ (where, Ma is at least one kind selected from Pb and Ca, Mb is at least one kind selected from Ti, Zr and Sn, Re is at least one kind selected from La, Pr, Nd, Sm, Dy and Er, a, b, c, d, e and f designate mol. %, $0.5 \leq a \leq 4.5$, $2.0 \leq b \leq 6.0$, $0.5 \leq c \leq 4.5$, $0 < d \leq 4.0$, $6.5 \leq e \leq 10.0$ and $0.5 \leq f \leq 5.5$), and 0.05 to 2.5 wt. % of first by-component consisting of glass whose main component is $SiO_2$, and 0.01 to 0.5 wt. % of second by-component consisting of at least one kind from oxides of Cr, Mn, Fe, Co and Ni.

Hereupon, as the glass which is the by-component consisting of $SiO_2$ as the main component, there is, for example, $BaO$—$SrO$—$CaO$—$Li_2O$—$SiO_2$. This glass is a sintering assistant which brings the baking temperature to 1160° C. or lower, but it is not limited thereto, oxide glass containing boron such as $BaO$—$Li_2O$—$B_2O_3$—$SiO_3$ may also be used. The non-oxide glass such as $SiO_2$—$B_4C$ may also be used. The $SiO_2$—$B_4C$ glass is particularly useful when a molding binder of ceramic materials is a water binder.

The dielectric ceramic compositions according to the present invention can be baked at 1160° C. or lower, and in a wide temperature range of $-55°$ C. to $+150°$ C., its TC satisfies the R characteristic and its temperature characteristic is flat. Thus, a ceramic laminated capacitor using these dielectric ceramic compositions can be used in all kinds of electrical equipments which are installed in locations, where the temperature change is large under various conditions.

Since the mechanical strength of the ceramics is high, when used as the ceramic laminated capacitor, destructions such as cracks and, flaws at mounting to the circuit board are eliminated. And hence, accidents caused by improper short-circuit and exoergical damages can be prevented.

Furthermore, since the bias TC is small, the dielectric ceramic layer can be processed into a thin film of 10 μm to 15 μm thick, thus the small-sized and large capacity ceramic laminated capacitor can be realized.

The above and other objects, features, aspects and advantages of the present invention will become more apparent from the following detailed description made with reference to the drawings.

DESCRIPTION OF THE PREFERRED EMBODIMENTS

(Embodiment 1)

First, a method of preparing a main component of a dielectric ceramic composition is described. As starting materials, the industrial materials such as $BaTiO_3$, PbO, $TiO_2$, ZnO, $Bi_2O_3$, $Nb_2O_5$ and $Re_2O_3$ (Re is one of La, Pr, Nd, Sm, Dy and Er) were prepared. The starting materials were weighed to have composition ratios as shown in Table 1, then evaporated and dried after mixing and grinding for 16 hours in a wet ball mill to obtain a powdered mixture. The resulting powdered mixture introduced into a zirconia box was calcined at 1000° C. for 2 hour in a natural atmosphere, then roughly ground so as to pass through a sieve of 200 meshes to obtain the material powder for main component of the dielectric ceramic composition.

Next, a method of preparing a first by-component of the dielectric ceramic composition is described. In this embodiment, as the first by-component which brings the baking temperature to 1160° C. or lower, oxide glass whose composition is represented by 8 BaO—6 SrO—6 CaO—30 $Li_2O$—50$SiO_2$ (mol. %) was used. As starting materials, the industrial materials such as $BaCO_3$, $SrCO_3$, $CaCO_3$, $Li_2O$ and $SiO_2$ were prepared. The starting materials were weighed to have the above-mentioned composition, then evaporated and dried after mixing and grinding for 16 hours in a wet ball mill to obtain a powdered mixture. The resulting powdered mixture was introduced into a crucible made of alumina and shelved for 1 hour at 1300° C., then quenched for vitrification. The glassy product was ground so as to pass through a sieve of 200 meshes to obtain the material powder for first by-component of the dielectric ceramic composition.

The material powder of first by-component of the dielectric ceramic composition obtained in a manner mentioned above was added to the material powder for main component of the dielectric ceramic composition to obtain weight per-cents as shown in Table 1.

For second by-component, the industrial materials such as $Cr_2O_3$, $MnO_2$, $Fe_2O_3$, $Co_2O_3$ and NiO were prepared. The second by-component was added to the main component whose composition is 93.0 ($Ba_{97}Pb_3$)$TiO_3$—1.5 ZnO—1.5 $Bi_2O_3$ 2.0 $Nb_2O_5$—2.0 $Nd_2O_3$ (mol. %), to which 1.0 wt. % of the above-mentioned first by-component is added, to obtain composition ratios as shown in Table 2.

To these additives, a polyvinyl butyral binder and an organic solvent such as toluene, ethyl alcohol and the like were added, and mixed in a wet ball mill for 16 hours, then molded into a sheet by a doctor blade method to obtain a green sheet. A thickness of the green sheet was 19 m. After printing an internal electrode pattern on the green sheet with a paste of Ag/Pd=70/30 (wt. %), 6 layers of green sheets are laminated and pressed together with dummy sheets to obtain a laminate. Molded pieces of 5.5 mm length ×4.5 mm width ×1 mm thickness were cut out from the laminate. Thereafter, the molded pieces were baked at baking temperatures shown in Table 3 and Table 4 for 2 hours to obtain a sinter. A thickness of the sintered dielectric was 13 μm.

Then, a silver electrode was baked onto an end face of the resulting sinter to obtain a subject (a laminated capacitor), whose dielectric constant ($\epsilon$), dielectric loss (tan $\delta$), TC and bias TC were measured.

In this case, the dielectric constant ($\epsilon$) and dielectric loss (tan $\delta$) were measured at the condition of 25° C., 1 KHz and 1 Vrms. As the TC, a maximum value of temperature change factor, or a maximum change factor ($\Delta C$ max), between −55° C. and +150° C. was obtained, based on an electrostatic capacity at 25° C. For the bias TC, as same as the TC, a maximum change factor ($\Delta C_{maxB}$) was obtained, based on an electrostatic capacity at 25° C. and applied voltage of 0° C., by measuring the electrostatic capacity as superposing the d.c. voltage 25V on the subject within the above-mentioned temperature range.

A deflective strength of the ceramic was measured by a 3-point bending method. The material sheets having the composition shown in Table 1 and Table 2 were pressed and molded to obtain a laminate, and mold pieces of 35 mm length ×7 mm width ×1.2 mm thickness were cut out from the laminate. Thereafter, the mold pieces were baked at the baking temperatures shown in Table 3 and Table 4 for 2 hours to obtain rectangular-shape ceramics. In such a manner, the deflective strength was measured on 20 samples for respective compositions to obtain the mean deflective strength of the ceramics of respective compositions.

Experiment results of the compositions in Table 1 as shown in Tale 3, and those of the compositions in Table 2 are shown in Table 4.

The reason for restricting ranges of the main component quantity, first by-component quantity and second by-component quantity in the present invention, is described.

First, the reason for restricting the main component composition is described.

The reason why a value of a or ZnO is 0.5 to 4.5 mol. % is that, as Sample No. 9, if it is below 0.5 mol. %, the TC exceeds −15% at the maximum change factor ($\Delta C_{max}$), and also the defective strength becomes 1500 kg/cm$^2$ or less. Also, as Sample No. 10, if it exceeds 4.5 mol. %, the TC exceeds − 15% at the maximum change factor ($\Delta C_{max}$) and also the bias TC exceeds −40%.

The reason why a value of b or Bi$_2$O$_3$ is 0.5 to 4.5 mol. % is that, as Sample No. 11, if it is below 0.5 mol. %, the TC exceeds −15% at the maximum change factor ($\Delta C_{max}$) and also the deflective strength becomes 1500 Kg/cm$^2$ or less. Also, as Sample No. 12, if it exceeds 4.5 mol. %, a dielectric constant ($\epsilon$) becomes less than 1000.

The reason why a value of c or Nb$_2$O$_5$ is 0.5 to 4.5 mol. % is that, as Sample No. 13, if it is below 0.5 mol. %, or as Sample No. 14, if it exceeds 4.5 mol. %, the TC exceeds −15% at the maximum change factor ($\Delta C_{max}$) and also the bias TC exceeds −40%.

The reason why a value d or Re$_2$O$_3$ is 0.5 to 5.5 mol. % is that, as Sample No. 15, if it is below 0.5 mol. %, the TC exceeds −15% at the maximum change factor ($\Delta C_{max}$) and also the bias TC exceeds −40%. Also, as Sample No. 16, if it exceeds 5.5 mol. %, the TC exceeds −15% at the maximum change factor ($\Delta C_{max}$).

As to a value of x or PbTiO$_3$, as Sample No. 17, if it exceeds 6.0 mol. %, the TC exceeds −15% at the maximum change factor ($\Delta C_{max}$) and also the bias TC exceeds −40%.

Next, the reason for restricting the first by-component quantity is described.

The reason why the first by-component quantity is 0.05 to 2.5 wt. % is that, as Sample No. 18, if it is below 0.05 wt. %, the baking temperature exceeds 1160° C. Also, as Sample No. 21, if it exceeds 2.5 wt. %, the dielectric constant ($\epsilon$) becomes less than 1000.

Next, the reason for restricting the second by-component quantity is described.

The second by-component is for preventing reduction of the dielectric ceramic, and the reason why its quantity is restricted to 0.01 to 0.5 wt. % is that, if it is below 0.01 wt. %, the reduction preventing effect is spoiled, and as Sample No. 31, if it exceeds 0.5 wt. %, a dielectric loss (tan $\delta$) exceeds 2.5%.

(Embodiment 2)

First, a method of preparing a main component of a dielectric ceramic composition is described. As starting materials, the industrial materials such as BaTiO$_3$, ZnO, Bi$_2$O$_3$, MeO$_2$ (Me is one of Ti, Zr and Sn), Nb$_2$O$_5$, Re$_2$O$_3$ (Re is one of La, Pr, Nd, Sm, Dy and Er) were prepared. The starting materials were weighed to have composition ratios as shown in Table 5, then evaporated and dried after mixing and grinding for 16 hours in a wet ball mill to obtain a powdered mixture. The resulting powdered mixture introduced into a zirconia box was calcined at 1000° C. for 2 hours in a natural atmosphere, then roughly ground so as to pass through a sieve of 200 meshes to obtain the material powder for main component of the dielectric ceramic composition.

Next, a method of preparing a first by-component of the dielectric ceramic composition is described. In this embodiment, as the first by-component which brings the baking temperature to 1160° C. or lower, oxide glass whose composition is represented by 8 BaO—6 SrO—6 CaO—30 Li$_2$O—50 SiO$_2$ (mol. %) was used. As starting materials, the industrial materials such as BaCO$_3$, SrCO$_3$, CaCO$_3$, Li$_2$O and SiO$_2$ were prepared. The starting materials were weighed to have the above-mentioned composition, then evaporated and dried after mixing and grinding for 16 hours in a wet ball mill to obtain a powdered mixture. The resulting powdered mixture was introduced into a crucible made of alumina and shelved for 1 hour at 1300° C., then quenched for vitrification. The glassy product was ground so as to pass through a sieve of 200 meshes to obtain the material powder for first by-component of the ceramic composition.

The material powder for first by-component of the dielectric ceramic composition obtained in a manner mentioned above was added to the material powder for main component of the dielectric ceramic composition to obtain weight per-cents as shown in Table 5.

For second by-component, the industrial materials such as Cr$_2$O$_3$, MnO$_2$, Fe$_2$O$_3$, Co$_2$O$_3$ and NiO were prepared. The second by-component was added to the main component, whose composition is 90.5 BaTiO$_3$—1.5 ZnO—3.0 Bi$_2$O$_3$—1.0 TiO$_2$—0.5 ZrO$_2$—1.5 Nb$_2$O$_5$—1.5 Nd$_2$O$_3$—0.5 Dy$_2$O$_3$ (mol. %) to which 1.0 wt. % of the above-mentioned first by-component is added, to obtain composition ratios as shown in Table 6.

To these additives, a polyvinyl butyral binder and an organic solvent such as toluene, ethyl alcohol and the like were added and mixed in a wet ball mill for 16 hours, then molded into a sheet by a doctor blade method to obtain a green sheet. A thickness of the green sheet was 19 μm. After printing an internal electrode pattern on the green sheet with a paste of Ag/Pd=70/30 (wt. %), 6 layers of green sheets were laminated and pressed together with dummy sheets to obtain a laminate. Mold pieces of 5.5 mm length ×4.5 mm width ×1 mm thickness were cut out from the laminate. Thereafter, the molds pieces were baked at baking temperatures shown in Table 7 and Table 8 for 2 hours to obtain a sinter. A thickness of the sintered dielectric was 13 μm.

Then, a silver electrode was baked onto an end face of the resulting sinter to obtain a subject (a laminated capacitor), whose dielectric constant ($\epsilon$), dielectric loss (tan δ), TC and bias TC were measured.

In this case, the dielectric constant ($\epsilon$) and dielectric loss (tan δ) were measured at the condition of 25° C., 1 KHz and 1 Vrms. As the TC, a maximum value of temperature change factor, or a maximum change factor ($\Delta C_{max}$), between −55° C. and +150° C. was obtained, based on an electrostatic capacity at 25° C. For the bias TC, as same as the TC, a maximum change factor ($\Delta C_{maxB}$) was obtained, based on an electrostatic capacity at 25° C. and applied voltage of 0V, by measuring the electrostatic capacity as superposing the d.c. voltage of 25V on the subject within the above-mentioned temperature range.

A deflective strength of the ceramic was measured by a 3-point bending method. First, the material sheets having the compositions shown in Table 5 and Table 6 were pressed and molded to obtain a laminate, and mold pieces of 35 mm length ×7 mm width ×1.2 mm thickness were cut out from the laminate. Thereafter, the mold pieces were baked at the baking temperature shown in Table 7 and Table 8 for 2 hours to obtain rectangular-shape ceramics. In such a manner, the deflective strength was measured on 20 samples for respective compositions to obtain the mean deflection strength of the ceramics of respective compositions.

Experiment results of the compositions in Table 5 are shown in Table 7, and those of the compositions in Table 6 are shown in Table 8.

The reason for restricting ranges of the main component quantity, first by-component quantity and second by-component quantity in the present invention, is described.

First, the reason for restricting the main component composition is described.

The reason why a value of a or ZnO is 0.5 to 4.5 mol. % is that, as Sample No. 109, if it is below 0.5 mol. %, the TC exceeds −15% at the maximum change factor ($\Delta C_{max}$) and also the deflective strength becomes 1500 kg/cm$^2$ or less. Also, as Sample No. 110, if it exceeds 4.5 mol. %, the TC exceeds −15% at the maximum change factor ($\Delta C_{max}$) and also the bias TC exceeds −40%.

The reason why a value of b or Bi$_2$O$_3$ is 2.0 to 6.0 mol. % is that, as Sample No. 111, if it is below 2.0 mol. %, the TC exceeds −15% at the maximum change factor ($\Delta C_{max}$), and also the deflective strength becomes 1500 kg/cm$^2$ or less. also, as Sample No. 112, if it exceeds 6.0 mol. %, the dielectric constant ($\epsilon$) becomes less than 1000.

The reason why a value of c or MeO$_2$ is 0.5 to 6.5 mol. % is that, as Sample No. 113, if it is below 0.5 mol. % or as Sample No. 114, if it exceeds 6.5 mol. %, the TC exceeds −15% at the maximum change factor ($\Delta C_{max}$).

The reason why a value of d or Nb$_2$O$_5$ is 0.5 to 4.5 mol. % is that, as Sample NO. 115, if it is below 0.5 mol. % or also as Sample No. 116, if it exceeds 4.5 mol. %, the TC exceeds −15% at the maximum change factor ($\Delta C_{max}$) and also the bias TC exceeds −40%.

The reason why a value of e or Re$_2$O$_3$ is 0.5 to 5.5 mol. % is that, as Sample No. 117, if it is below 0.5 mol. %, the TC exceeds −15% at the maximum change factor ($\Delta C_{max}$), and also the bias TC exceeds −40%. Also, as Sample No. 118, if it exceeds 5.5 mol. %, the TC exceeds −15% at the maximum change factor ($\Delta C_{max}$).

Next, the reason for restricting the first by-component quantity is described.

The reason why the first by-component quantity is restricted to 0.05 to 2.5 wt. % is that, as Sample No. 119 shown in Table 5, if it is below 0.05 wt. %, the baking temperature exceeds 1160° C. While, as Sample No. 122, if it exceeds 2.5 wt. %, the dielectric constant ($\epsilon$) becomes less than 1000.

Next, the reason for restricting the second by-component quantity is described.

The second by-component is for preventing reduction of the dielectric ceramics, and the reason why its range is restricted to 0.01 to 0.5 wt. % is that, if it is below 0.01 wt. %, the reduction preventing effect is spoiled, and as Sample No. 132 shown in Table 6, if it exceeds 0.5 wt. %, the dielectric loss (tan δ) exceeds 2.5%.

(Embodiment 3 )

First, a method of preparing a main component of a dielectric ceramic composition is described. As starting materials, the industrial materials such as BaTiO$_3$, ZnO, Bi$_2$O$_3$, Nb$_2$O$_5$, MaO (Ma is one of Pb and Ca), MeO$_2$ (Me is one of Ti, Zr and Sn), Re$_2$O$_3$ (Re is one of La, Pr, Nd, Sm, Dy and Er) were prepared. The starting materials were weighed to have composition ratios as shown in Table 9, then evaporated and dried after mixing and grinding for 16 hours in a wet ball mill to obtain a powdered mixture. The resulting powdered mixture introduced into a zirconia box was calcined at 1000° C. for 2 hours in a natural atmosphere, then roughly ground so as to pass through a sieve of 200 meshes to obtain the material powder for main component of the dielectric ceramic composition.

Next, a method of preparing a first by-component of the dielectric ceramic composition is described. In this embodiment, as the first by-component which brings the baking temperature to 1160° C. or lower, oxide glass whose main component is represented by 8 BaO—6 SrO—6 CaO—30 Li$_2$O —50SiO$_2$ (mol. %) was used. As starting materials, the industrial materials such as BaCO$_3$, SrCO$_3$, CaCO$_3$, Li$_2$O and SiO$_2$ were prepared. These starting materials were weighed to have the above-mentioned composition, then evaporated and dried after mixing and grinding in a wet ball mill for 16 hours to obtain a powdered mixture. The resulting powdered mixture was introduced into a crucible made of alumina and shelved for 1 hour at 1300° C., then quenched for vitrification. The glassy product was ground so as to pass through a sieve of 200 meshes to obtain the material powder for first by-component of the ceramic composition.

The material powder for first by-component of the dielectric ceramic competition obtained in a manner mentioned above was added to the material powder for main component of the dielectric ceramic compositions to obtain weight per-cents as shown in Table 9.

For second by-component, the industrial materials such $Cr_2O_3$, $MnO_2$, $Fe_2O_3$, $Co_2O_3$ and NiO were prepared. The second by-component was added to the main component-whose composition is 88.5 $BatiO_3$—1.5 ZnO—3.0 $Bi_2O_3$—1.0 $Nb_2O_5$—2.0 PbO—1.0 $TiO_2$—0.5 $SnO_2$—$_{0.5}$ $ZrO_2$—2.0 $Nd_2O_3$ (mol. %), to which 1.0 wt. % of the above-mentioned first by-component is added, to obtain the composition ratios as shown in Table 10.

To these additives, a polyvinyl bytyral binder and an organic solvent such as toluene, ethyl alcohol and the like were added and mixed in a wet ball mill for 16 hours, then molded into a sheet by a doctor blade method to obtain a green sheet. A thickness of the green sheet was 19 μm. After printing an internal electrode pattern on the green sheet with a paste of Ag/Pd=70/30 (wt. %), 6 layers of green sheets were laminated and pressed together with dummy sheets to obtain a laminate, and mold pieces of 5.5 mm length ×4.5 mm width ×1 mm thickness were cut out from the laminate. Thereafter, the mold pieces were baked at the baking temperatures shown in Table 11 and Table 12 for 2 hours to obtain a sinter. A thickness of the sintered dielectric was 13 μm.

Then, a silver electrode was baked onto an end face of the resulting sinter to obtain a subject (a laminated capacitor), whose dielectric constant ($\epsilon$), dielectric loss (tan $\delta$), TC and bias TC were measured.

In this case, the dielectric constant ($\epsilon$) and dielectric loss (tan $\delta$) were measured at the condition of 25° C., 1 KHz and 1Vrms. As the TC, a maximum value of temperature change factor, or a maximum change factor ($\Delta C_{max}$), between −55° C. and +150° C. was obtained, based on an electrostatic capacity at 25° C. For the bias TC, as same as the TC, a maximum change factor ($\Delta C_{maxB}$) was obtained, based on an electrostatic capacity at 25° C. and applied voltage of 0V, by measuring the electrostatic capacity as superposing the d.c. voltage of 25V on the subject within the above-mentioned temperature range.

A deflective strength of the ceramic was measured by a 3-point bending method. First, the material sheets having the compositions shown in Table 9 and Table 10 were pressed and molded to obtain a laminate, from which mold pieces of 35 mm length ×7 mm width ×1.2 mm thickness were cut out. Thereafter, the mold pieces were baked at the baking temperatures shown in Table 11 and Table 12 for 2 hours to obtain rectangular-shape ceramics. In such a manner, the deflective strength was measured on 20 samples for respective compositions to obtain the mean deflective strength of the ceramics of the respective compositions.

Experiment results of the compositions in Table 9 are shown in Table 11, land those of the compositions in Table 10 are shown in Table 12.

The reason for restricting ranges of the main component quantity, first by-component quantity and second by-component quantity in the present invention is described.

First, the reason for restricting the main component composition is described.

The reason why a value of a or ZnO is 0.5 to 4.5 mol. % is that, as Sample No. 209, if it is below 0.5 mol. %, the TC exceeds −15% at the maximum change factor ($\Delta C_{max}$), and also the deflective strength becomes 1500 kg/cm² or less. Also, as Sample No. 210, if it exceeds 4.5 mol. %, the TC exceeds −15% at the maximum change factor ($\Delta C_{max}$) and also the bias TC exceeds −40%.

The reason why a value of b or $Bi_2O_3$ is 2.0 to 6.0 mol. % is that, as Sample No. 211, if it is below 2.0 wt. %, the TC exceeds −15% at the maximum change factor ($\Delta C_{max}$), and also the deflective strength becomes 1500kg/cm² or less. Also, as Sample No. 212, if it exceeds 6.0 mol. %, the dielectric constant ($\epsilon$) becomes less than 1000.

The reason why a value of C or $Nb_2O_3$ is 0.5 to 4.5 mol. % is that, as Sample No. 213, if it is below 0.5 mol. % or as Sample No. 214, if it exceeds 4.5 mol. %, the TC exceeds −15% at the maximum change factor ($\Delta C_{max}$) and also the bias TC exceeds −40%.

The reason why a value of d or MaO is 4.0 mol. % or less is that, as Sample No. 215, if it exceeds 4.0 mol. %, the TC exceeds −15% at the maximum change factor ($\Delta C_{max}$).

The reason why a value of e or $MbO_2$ is 6.5 to 10.0 mol. % is that, as Sample No. 216, if it is below 6.5 mol. % or as Sample No. 217, if it exceeds 10.0 mol. %, the TC exceeds −15% at the maximum change factor ($\Delta C_{max}$).

The reason why a value of f or $Re_2O_3$ is 0.5 to 5.5 mol. % is that, as Sample No. 218, if it is below 0.5 mol. %, the TC exceeds −15% at the maximum change factor ($\Delta C_{max}$) and also the bias TC exceeds −40%. Also, as Sample No. 219, if it exceeds 5.5 mol. %, the TC exceeds −15% at the maximum change factor ($\Delta C_{max}$).

Next, the reason for restricting the first by-component quantity is described.

The reason why the first by-component quantity is 0.05 to 2.5 wt. % is that, as Sample No. 220 shown in Table 9, if it is below 0.05 wt. %, the baking temperature exceeds 1160° C. While, as Sample No. 222, if it is exceeds 2.5 wt. %, the dielectric constant ($\epsilon$) becomes less than 1000.

Next, the reason for restricting the second by-component quantity is described.

The second by-component is for preventing reduction of the dielectric ceramics, and the reason why the second by-component quantity is restricted to 0.01 to 0.5 wt. % is that, if it is below 0.01 wt. %, the reduction preventing effect is spoiled, and as Sample No. 232 shown in Table 10, if it exceeds 0.5 wt. %, the dielectric loss (tan $\delta$) exceeds 2.5%.

In the above-mentioned embodiments, the by-components, which are prepared into a predetermined composition ratio beforehand, and ground for vitrification after heating and melting at high temperature, were added to and blended with the main components of the ceramic compositions.

However, as a method of adding the first by-component, alternatively, the starting materials, which are modified by preparing into a predetermined ratio beforehand and heating to temperature just before the melting point may be added, or composition elements of the first by-component may be individually added to the main component at any state such as metal alkoxide so as to melt and react during baking for vitrification.

In the above-mentioned embodiments, also in the case of second by-component, though it is added in the form of oxides from the beginning, as the starting materials at the time of preparing the materials, carbonates of the elements which turn into oxides during calcining and baking may also be used.

While the present invention has been particularly described, it is to be understood that such description is used merely as an example rather than limitation, and the spirit and scope of the present invention is determined solely by the terms of the appended claims.

TABLE 1

| | main component compositon (mol %) {100 − (a + b + c + d)} (Ba$_{100-x}$Pb$_x$)TiO$_3$ + aZnO + bBi$_2$O$_3$ + cNb$_2$O$_5$ + dRe$_2$O$_3$ | | | | | | | | | | | main component (wt %) | first by-component (wt %) |
|---|---|---|---|---|---|---|---|---|---|---|---|---|---|
| Sample No. | 100 − (a + b + c + d) | a | b | c | La$_2$O$_3$ | Pr$_2$O$_3$ | Nd$_2$O$_3$ | Sm$_2$O$_3$ | Dy$_2$O$_3$ | Er$_2$O$_3$ | x | | |
| 1 | 93 | 1.5 | 2.5 | 2 | 0 | 0 | 1 | 0 | 0 | 0 | 1 | 99 | 1 |
| 2 | 89 | 2 | 4 | 3 | 0.5 | 1 | 0 | 0 | 0.5 | 0 | 1.5 | 98 | 2 |
| 3 | 87.5 | 1 | 4.5 | 4 | 0 | 0 | 2.5 | 0 | 0.5 | 0 | 1 | 99.5 | 0.5 |
| 4 | 91 | 4 | 2 | 1 | 0.5 | 0 | 0 | 0.5 | 0 | 1 | 5 | 99 | 1 |
| 5 | 93 | 1.5 | 3 | 1.5 | 0 | 0.5 | 0 | 0 | 0 | 0.5 | 4 | 98.5 | 1.5 |
| 6 | 86.5 | 2.5 | 3 | 3 | 2.5 | 0 | 2.5 | 0 | 0 | 0 | 2 | 99.5 | 0.5 |
| 7 | 88.5 | 4.5 | 2.5 | 2 | 0 | 1 | 0 | 0 | 1.5 | 0 | 3 | 98 | 2 |
| 8 | 86.5 | 1.5 | 3 | 4.5 | 0 | 0 | 2.5 | 1.5 | 0 | 0.5 | 1.5 | 98 | 2 |
| *9 | 93.7 | 0.3 | 2.5 | 2 | 0.5 | 0 | 0.5 | 0 | 0.5 | 0 | 2 | 99 | 1 |
| *10 | 86.8 | 4.7 | 4 | 3 | 0 | 0 | 1.5 | 0 | 0 | 0 | 1.5 | 99.5 | 0.5 |
| *11 | 93.2 | 1.5 | 0.3 | 2.5 | 0 | 0 | 0 | 2 | 0 | 0.5 | 0.5 | 98 | 2 |
| *12 | 85.8 | 2 | 4.7 | 4.5 | 0 | 0 | 3 | 0 | 0 | 0 | 1.0 | 99.5 | 0.5 |
| *13 | 92.7 | 1 | 4 | 0.3 | 0 | 2 | 0 | 0 | 0 | 0 | 1.0 | 99 | 1 |
| *14 | 88.8 | 1.5 | 2.5 | 4.7 | 0 | 0 | 0 | 2.5 | 0 | 0 | 1.5 | 99 | 1 |
| *15 | 93.7 | 1.5 | 2.5 | 2 | 0.3 | 0 | 0 | 0 | 0 | 0 | 2 | 99 | 1 |
| *16 | 87.8 | 1.5 | 3 | 2 | 0 | 0.7 | 2.5 | 2.5 | 0 | 0 | 2.5 | 99.5 | 0.5 |
| *17 | 87.5 | 1 | 4.5 | 4 | 0 | 0 | 2.5 | 0 | 0.5 | 0 | 6.2 | 99.5 | 0.5 |
| *18 | 93 | 1.5 | 2.5 | 2 | 0 | 0 | 1 | 0 | 0 | 0 | 1.0 | 100 | 0 |
| 19 | 91.5 | 4 | 2 | 1 | 0 | 0 | 1.5 | 0 | 0 | 0 | 1.0 | 99.95 | 0.05 |
| 20 | 92 | 1.5 | 2.5 | 2 | 0 | 0 | 2 | 0 | 0 | 0 | 2.5 | 97.5 | 2.5 |
| *21 | 91 | 4 | 2 | 1 | 0 | 0 | 2 | 0 | 0 | 0 | 0.5 | 97.3 | 2.7 |

*indicates out of the scope of the invention

TABLE 2

| Sample No. | main component (wt %) | first by-component (wt %) | second by-component (wt %) | | | | |
|---|---|---|---|---|---|---|---|
| | | | Cr | Mn | Fe | Co | Ni |
| 22 | 98.99 | 1.0 | 0 | 0.01 | 0 | 0 | 0 |
| 23 | 98.85 | 1.0 | 0.05 | 0.05 | 0.05 | 0 | 0 |
| 24 | 98.95 | 1.0 | 0 | 0 | 0 | 0.05 | 0 |
| 25 | 98.9 | 1.0 | 0.05 | 0 | 0 | 0 | 0.05 |
| 26 | 98.85 | 1.0 | 0 | 0.1 | 0 | 0 | 0.05 |
| 27 | 98.65 | 1.0 | 0.05 | 0.2 | 0.05 | 0.05 | 0 |
| 28 | 98.6 | 1.0 | 0 | 0.3 | 0 | 0 | 0.1 |
| 29 | 98.55 | 1.0 | 0 | 0.3 | 0 | 0.1 | 0.05 |
| 30 | 98.5 | 1.0 | 0.1 | 0.3 | 0 | 0.1 | 0 |
| *31 | 98.45 | 1.0 | 0 | 0.35 | 0.05 | 0.1 | 0.05 |

*indicates out of the scope of the invention

TABLE 3

| Sample No. | baking temperature (°C.) | electronic property | | | | mechanical property deflective strength (kg/cm$^2$) |
|---|---|---|---|---|---|---|
| | | ε | tan δ (%) | TC (%) ΔC$_{max}$ | bias TC (%) ΔC$_{maxB}$ | |
| 1 | 1140 | 2020 | 1.6 | −12.8 | −33.0 | 2070 |
| 2 | 1100 | 1810 | 1.5 | −13.9 | −30.0 | 2400 |
| 3 | 1100 | 1690 | 1.6 | −14.0 | −30.3 | 2180 |
| 4 | 1160 | 2020 | 1.7 | 10.0 | −34.0 | 1910 |
| 5 | 1120 | 1770 | 1.7 | 11.0 | −31.0 | 2210 |
| 6 | 1080 | 1360 | 1.8 | −14.0 | −28.5 | 2310 |
| 7 | 1100 | 1690 | 1.5 | 10.2 | −33.2 | 2100 |
| 8 | 1140 | 1630 | 1.6 | 11.8 | −31.5 | 2130 |
| *9 | 1160 | 1680 | 2.2 | −17.5 | −33.5 | 1450 |
| *10 | 1080 | 2130 | 1.5 | −22.0 | −41.5 | 2060 |
| *11 | 1080 | 1620 | 1.7 | −23.0 | −36.0 | 1480 |
| *12 | 1080 | 980 | 1.8 | −14.5 | −26.5 | 2310 |
| *13 | 1080 | 1790 | 1.9 | −22.5 | −41.0 | 2270 |
| *14 | 1100 | 1420 | 1.9 | −16.0 | −40.8 | 2010 |
| *15 | 1140 | 1450 | 1.7 | −21.0 | −41.1 | 1970 |
| *16 | 1120 | 1500 | 1.1 | −18.2 | −35.1 | 1820 |
| *17 | 1080 | 1910 | 2.3 | 18.0 | −42.0 | 2220 |
| *18 | | | | 1160° C. (not sintered) | | |
| 19 | 1160 | 1680 | 2.0 | 13.0 | −36.0 | 1870 |
| 20 | 1080 | 1290 | 1.9 | 14.0 | −33.5 | 2130 |
| *21 | 1080 | 930 | 2.1 | 14.1 | −34.5 | 2100 |

*indicates out of the scope of the invention

TABLE 4

| Sample No. | baking temperature (°C.) | electronic property | | | | mechanical property deflective strength (kg/cm$^2$) |
|---|---|---|---|---|---|---|
| | | ε | tan δ (%) | TC (%) ΔC$_{max}$ | bias TC (%) ΔC$_{maxB}$ | |
| 22 | 1100 | 2000 | 1.7 | −11.8 | −31.0 | 2060 |

TABLE 4-continued

| Sample No. | baking temperature (°C.) | electronic property ε | tan δ (%) | TC (%) $\Delta C_{max}$ | bias TC (%) $\Delta C_{maxB}$ | mechanical property deflective strength (kg/cm²) |
|---|---|---|---|---|---|---|
| 23 | 1100 | 1910 | 1.7 | −12.0 | −31.5 | 2010 |
| 24 | 1100 | 1970 | 1.8 | −11.8 | −31.0 | 1970 |
| 25 | 1100 | 1940 | 1.8 | −11.5 | −30.8 | 2070 |
| 26 | 1100 | 1970 | 1.5 | −11.5 | −31.0 | 2060 |
| 27 | 1100 | 1850 | 2.1 | −12.0 | −31.7 | 1970 |
| 28 | 1100 | 1900 | 2.1 | −11.5 | −31.1 | 1950 |
| 29 | 1100 | 1960 | 2.2 | −11.8 | −32.0 | 1960 |
| 30 | 1100 | 1920 | 2.3 | −11.6 | −31.3 | 1970 |
| *31 | 1100 | 1920 | 2.8 | −11.4 | −31.1 | 2010 |

*indicates out of the scope of the invention

TABLE 5 main component composition (mol %)
$\{100 - (a + b + c + d + e)\} BaTiO_3 + aZnO + bBi_2O_3 + cMeO_2 + dNb_2O_5 + eRe_2O_3$

| Sample No. | 100 − (a + b + c + d + e) | a | b | c TiO₂ | ZrO₂ | SnO₂ | d | e La₂O₃ | Pr₂O₃ | Nd₂O₃ | Sm₂O₃ | Dy₂O₃ | Er₂O₃ | main component (wt %) | first by-component (wt %) |
|---|---|---|---|---|---|---|---|---|---|---|---|---|---|---|---|
| 101 | 92 | 1.5 | 2.5 | 2 | 0 | 0 | 1 | 0 | 0 | 1 | 0 | 0 | 0 | 99 | 1 |
| 102 | 89 | 1 | 4 | 1.5 | 1.5 | 0 | 1.5 | 0.5 | 1 | 0 | 0 | 0 | 0 | 98 | 2 |
| 103 | 84 | 0.5 | 5.5 | 1.5 | 2 | 1.5 | 2 | 0 | 0 | 2.5 | 0 | 0.5 | 0 | 99.5 | 0.5 |
| 104 | 87 | 4 | 2 | 0.5 | 0 | 0.5 | 4 | 0.5 | 0 | 0 | 0.5 | 0 | 1 | 99 | 1 |
| 105 | 90 | 1.5 | 3 | 0 | 0 | 0.5 | 4.5 | 0 | 0.5 | 0 | 0 | 0 | 0 | 98.5 | 1.5 |
| 106 | 79.5 | 2.5 | 6 | 0 | 5.5 | 1 | 0.5 | 2.5 | 0 | 2.5 | 0 | 0 | 0 | 99.5 | 0.5 |
| 107 | 87 | 4.5 | 2.5 | 2 | 0 | 0 | 1.5 | 0 | 1 | 0 | 0 | 1.5 | 0 | 98 | 2 |
| 108 | 86 | 1.5 | 3 | 0.5 | 1.5 | 0 | 2 | 0 | 0 | 2.5 | 1.5 | 0 | 1.5 | 98 | 2 |
| *109 | 92.7 | 0.3 | 2.5 | 0 | 0.5 | 1.5 | 1 | 0.5 | 0 | 0.5 | 0 | 0.5 | 0 | 99 | 1 |
| *110 | 86.3 | 4.7 | 4 | 0 | 0.5 | 0 | 3 | 0 | 0 | 1.5 | 0 | 0 | 0 | 99.5 | 0.5 |
| *111 | 90.2 | 1.5 | 1.8 | 1.5 | 0.5 | 0.5 | 1.5 | 0 | 0 | 0 | 2 | 0 | 0.5 | 98 | 2 |
| *112 | 81.3 | 2 | 6.2 | 2 | 2 | 2 | 1.5 | 0 | 0 | 3 | 0 | 0 | 0 | 99.5 | 0.5 |
| *113 | 88.7 | 2 | 4 | 0.3 | 0 | 0 | 3 | 0 | 2 | 0 | 0 | 0 | 0 | 99 | 1 |
| *114 | 84.3 | 1.5 | 5 | 3 | 2 | 1.7 | 2.5 | 0 | 0 | 0 | 2.5 | 0 | 0 | 99 | 1 |
| *115 | 91.2 | 2 | 2.5 | 0.5 | 0.5 | 1 | 0.3 | 0 | 0 | 0 | 0 | 2 | 0 | 99 | 1 |
| *116 | 82.8 | 2.5 | 4.5 | 1 | 2 | 1 | 4.7 | 0 | 0 | 0 | 0 | 0 | 1.5 | 99.5 | 0.5 |
| *117 | 92.7 | 1.5 | 2.5 | 0.5 | 1.5 | 0 | 1 | 0.3 | 0 | 0 | 0 | 0 | 0 | 99 | 1 |
| *118 | 85.8 | 1.5 | 3 | 0.5 | 0.5 | 1 | 2 | 0 | 0.7 | 2.5 | 2.5 | 0 | 0 | 99.5 | 0.5 |
| *119 | 92 | 1.5 | 2.5 | 0 | 0 | 2 | 1 | 0 | 0 | 1 | 0 | 0 | 0 | 100 | 0 |
| 120 | 87.5 | 4 | 2 | 0.5 | 0.5 | 0 | 4 | 0 | 0 | 1.5 | 0 | 0 | 0 | 99.95 | 0.05 |
| 121 | 91 | 1.5 | 2.5 | 1 | 0 | 1 | 1 | 0 | 0 | 2 | 0 | 0 | 0 | 97.5 | 2.5 |
| *122 | 87 | 4 | 2 | 0 | 0.5 | 0.5 | 4 | 0 | 0 | 2 | 0 | 0 | 0 | 97.3 | 2.7 |

*indicates out of the scope of the invention

TABLE 6

| Sample No. | main component (wt %) | first by-component (wt %) | second by-component (wt %) Cr | Mn | Fe | Co | Ni |
|---|---|---|---|---|---|---|---|
| 123 | 98.99 | 1.0 | 0 | 0.01 | 0 | 0 | 0 |
| 124 | 98.85 | 1.0 | 0.05 | 0.05 | 0.05 | 0 | 0 |
| 125 | 98.95 | 1.0 | 0 | 0 | 0 | 0.05 | 0 |
| 126 | 98.9 | 1.0 | 0.05 | 0 | 0 | 0 | 0.05 |
| 127 | 98.85 | 1.0 | 0 | 0.1 | 0 | 0 | 0.05 |
| 128 | 98.65 | 1.0 | 0.05 | 0.2 | 0.05 | 0.05 | 0 |
| 129 | 98.6 | 1.0 | 0 | 0.3 | 0 | 0 | 0.1 |
| 130 | 98.55 | 1.0 | 0 | 0.3 | 0 | 0.1 | 0.05 |
| 131 | 98.5 | 1.0 | 0.1 | 0.3 | 0 | 0.1 | 0 |
| *132 | 98.45 | 1.0 | 0 | 0.35 | 0.05 | 0.1 | 0.05 |

*indicates out of the scope of the invention

TABLE 7

| Sample No. | baking temperature (°C.) | electronic property ε | tan δ (%) | TC (%) $\Delta C_{max}$ | bias TC (%) $\Delta C_{maxB}$ | mechanical property deflective strength (kg/cm²) |
|---|---|---|---|---|---|---|
| 101 | 1140 | 2010 | 1.5 | −12.1 | −33.5 | 2060 |
| 120 | 1100 | 1790 | 1.5 | −13.3 | −30.0 | 2290 |
| 103 | 1100 | 1800 | 1.6 | −14.2 | −30.5 | 2170 |
| 104 | 1160 | 2010 | 1.7 | −11.8 | −32.0 | 1770 |
| 105 | 1120 | 1760 | 1.7 | −10.6 | −33.0 | 2210 |
| 106 | 1080 | 1370 | 1.2 | −14.2 | −28.5 | 2200 |
| 107 | 1100 | 1620 | 1.2 | −14.5 | −33.0 | 2080 |
| 108 | 1100 | 1640 | 1.6 | 12.1 | −31.5 | 2150 |
| *109 | 1160 | 1690 | 2.1 | −17.5 | −33.8 | 1480 |
| *110 | 1120 | 2220 | 1.3 | −21.4 | −43.5 | 2020 |
| *111 | 1120 | 1740 | 1.8 | −23.3 | −37.0 | 1470 |
| *112 | 1100 | 980 | 1.3 | −14.7 | −28.0 | 2260 |
| *113 | 1100 | 1820 | 1.6 | −23.5 | −31.0 | 2300 |
| *114 | 1140 | 1510 | 1.0 | −17.0 | −31.5 | 2010 |
| *115 | 1140 | 1940 | 1.1 | −22.5 | −41.7 | 1980 |

TABLE 7-continued

| Sample No. | baking temperature (°C.) | electronic property ε | tan δ (%) | TC (%) ΔC$_{max}$ | bias TC (%) ΔC$_{maxB}$ | mechanical property deflective strength (kg/cm$^2$) |
|---|---|---|---|---|---|---|
| *116 | 1120 | 1620 | 1.7 | −18.0 | −44.8 | 2100 |
| *117 | 1160 | 1540 | 1.9 | −29.5 | −43.0 | 2050 |
| *118 | 1160 | 1910 | 1.2 | −24.5 | −35.2 | 1810 |
| *119 | | | 1160° C. (not sintered) | | | |
| 120 | 1160 | 1700 | 1.3 | 13.0 | −35.0 | 1620 |
| 121 | 1080 | 1390 | 1.2 | 13.5 | −33.4 | 2150 |
| *122 | 1080 | 950 | 1.1 | 14.1 | −34.4 | 2120 |

*indicates out of the scope of the invention

TABLE 8

| Sample No. | baking temperature (°C.) | electronic property ε | tan δ (%) | TC (%) ΔC$_{max}$ | bias TC (%) ΔC$_{maxB}$ | mechanical property deflective strength (kg/cm$^2$) |
|---|---|---|---|---|---|---|
| 123 | 1120 | 2000 | 1.5 | −12.1 | −33.0 | 2040 |
| 124 | 1120 | 1920 | 1.7 | −12.0 | −33.3 | 2020 |
| 125 | 1120 | 2010 | 1.5 | −12.5 | −34.2 | 1980 |
| 126 | 1120 | 1970 | 1.6 | −12.5 | −33.0 | 2060 |
| 127 | 1120 | 2060 | 1.6 | −13.0 | −34.0 | 2050 |
| 128 | 1120 | 1890 | 2.0 | −12.1 | −33.0 | 1970 |
| 129 | 1120 | 1920 | 2.1 | −12.0 | −32.8 | 1960 |
| 130 | 1120 | 1950 | 2.1 | −12.5 | −35.5 | 1970 |
| 131 | 1120 | 1920 | 2.2 | −12.7 | −33.5 | 1980 |
| *132 | 1120 | 1820 | 2.8 | −11.8 | −32.2 | 1990 |

*indicates out of the scope of the invenition

TABLE 9 main component composition (mol %)
{100 − (a + b + c + d + e + f)} BaTiO$_3$ + aZnO + bBi$_2$O$_3$ + cNb$_2$O$_5$ + dMaO + eMbO$_2$ + fRe$_2$O$_3$

| Sample No. | 100 − (a+b+c+d+e+f) | a | b | c | d PbO | d CaO | e TiO$_2$ | e ZrO$_2$ | e SnO$_2$ | f La$_2$O$_3$ | f Pr$_2$O$_3$ | f Nd$_2$O$_3$ | f Sm$_2$O$_3$ | f Dy$_2$O$_3$ | f Er$_2$O$_3$ | main component (wt %) | first by-component (wt %) |
|---|---|---|---|---|---|---|---|---|---|---|---|---|---|---|---|---|---|
| 201 | 85.5 | 1.5 | 2.5 | 1 | 0.5 | 0 | 4 | 2 | 2 | 0 | 0 | 1 | 0 | 0 | 0 | 99 | 1 |
| 202 | 82.5 | 1 | 4 | 1.5 | 0 | 0.5 | 5 | 3 | 1 | 0.5 | 1 | 0 | 0 | 0 | 0 | 98 | 2 |
| 203 | 80.5 | 0.5 | 5.5 | 2 | 2 | 0 | 2 | 4 | 0.5 | 0 | 0 | 2.5 | 0 | 0.5 | 0 | 99.5 | 0.5 |
| 204 | 78.5 | 4 | 2 | 4 | 0 | 1.5 | 4 | 0 | 4 | 0.5 | 0 | 0 | 0.5 | 0 | 1 | 99 | 1 |
| 205 | 78.5 | 1.5 | 3 | 4.5 | 2 | 2 | 4 | 4 | 0 | 0 | 0.5 | 0 | 0 | 0 | 0 | 98.5 | 1.5 |
| 206 | 75 | 2.5 | 6 | 0.5 | 4 | 0 | 0 | 4 | 3 | 2.5 | 0 | 2.5 | 0 | 0 | 0 | 99.5 | 0.5 |
| 207 | 79 | 4.5 | 2.5 | 1.5 | 0 | 3 | 4 | 2 | 1 | 0 | 1 | 0 | 0 | 1.5 | 0 | 98 | 2 |
| 208 | 77.5 | 1.5 | 3 | 2 | 1.5 | 2 | 3 | 2 | 2 | 0 | 0 | 2.5 | 1.5 | 0 | 1.5 | 98 | 2 |
| *209 | 85.2 | 0.3 | 2.5 | 1 | 2 | 0 | 4.5 | 1 | 2 | 0.5 | 0 | 0.5 | 0 | 0.5 | 0 | 99 | 1 |
| *210 | 77.8 | 4.7 | 4 | 3 | 2 | 0 | 5 | 1.5 | 0.5 | 0 | 0 | 1.5 | 0 | 0 | 0 | 99.5 | 0.5 |
| *211 | 84.2 | 1.5 | 1.8 | 1.5 | 1.5 | 0.5 | 1.5 | 3 | 2 | 0 | 0 | 0 | 2 | 0 | 0.5 | 98 | 2 |
| *212 | 76.8 | 2 | 6.2 | 1.5 | 0.5 | 3 | 4 | 1.5 | 1.5 | 0 | 0 | 3 | 0 | 0 | 0 | 99.5 | 0.5 |
| *213 | 82.7 | 2 | 4 | 0.3 | 1 | 0 | 3.5 | 2 | 2.5 | 0 | 2 | 0 | 0 | 0 | 0 | 99 | 1 |
| *214 | 79.8 | 1.5 | 2.5 | 4.7 | 0 | 1 | 4 | 2 | 2 | 0 | 0 | 0 | 2.5 | 0 | 0 | 99 | 1 |
| *215 | 78.8 | 2 | 2.5 | 2 | 2.2 | 2 | 5 | 2 | 1.5 | 0 | 0 | 0 | 0 | 2 | 0 | 99 | 1 |
| *216 | 80.7 | 2.5 | 4.5 | 1.5 | 1 | 2 | 3 | 2 | 1.3 | 0 | 0 | 0 | 0 | 0 | 1.5 | 99.5 | 0.5 |
| *217 | 79.3 | 1.5 | 2.5 | 1 | 0 | 1.5 | 4 | 2.2 | 4 | 0 | 0 | 0 | 4 | 0 | 0 | 99 | 1 |
| *218 | 85.2 | 1.5 | 3 | 2 | 1 | 0 | 6 | 1 | 0 | 0.3 | 0 | 0 | 0 | 0 | 0 | 99.5 | 0.5 |
| *219 | 76.3 | 1.5 | 2.5 | 1 | 3 | 1 | 5 | 0 | 4 | 0 | 0.7 | 2.5 | 2.5 | 0 | 0 | 99 | 1 |
| *220 | 77.5 | 4 | 2 | 4 | 3 | 1 | 3 | 3 | 1 | 0 | 0 | 1.5 | 0 | 0 | 0 | 100 | 0 |
| 221 | 83.5 | 1.5 | 2.5 | 1 | 2 | 0 | 3.5 | 1 | 3 | 0 | 0 | 2 | 0 | 0 | 0 | 97.5 | 2.5 |
| *222 | 78 | 4 | 2 | 4 | 1 | 0 | 5 | 2 | 2 | 0 | 0 | 2 | 0 | 0 | 0 | 97.3 | 2.7 |

*indicates out of the scope of the invention

TABLE 10

| Sample No. | main component (wt %) | first by-component (wt %) | second by-component (wt %) Cr | Mn | Fe | Co | Ni |
|---|---|---|---|---|---|---|---|
| 223 | 98.99 | 1.0 | 0 | 0.01 | 0 | 0 | 0 |
| 224 | 98.85 | 1.0 | 0.05 | 0.05 | 0.05 | 0 | 0 |
| 225 | 98.95 | 1.0 | 0 | 0 | 0 | 0.05 | 0 |
| 226 | 98.9 | 1.0 | 0.05 | 0 | 0 | 0 | 0.05 |
| 227 | 98.85 | 1.0 | 0 | 0.1 | 0 | 0 | 0.05 |
| 228 | 98.65 | 1.0 | 0.05 | 0.2 | 0.05 | 0.05 | 0 |
| 229 | 98.6 | 1.0 | 0 | 0.3 | 0 | 0 | 0.1 |
| 230 | 98.55 | 1.0 | 0 | 0.3 | 0 | 0.1 | 0.05 |
| 231 | 98.5 | 1.0 | 0.1 | 0.3 | 0 | 0.1 | 0 |
| *232 | 98.45 | 1.0 | 0 | 0.35 | 0.05 | 0.1 | 0.05 |

*indicates out of the scope of the invention

TABLE 11

| Sample No. | baking temperature (°C.) | electronic property ε | tan δ (%) | TC (%) ΔC$_{max}$ | bias TC (%) ΔC$_{maxB}$ | mechanical property deflective strength (kg/cm²) |
| --- | --- | --- | --- | --- | --- | --- |
| 201 | 1140 | 2020 | 1.4 | −12.0 | −32.5 | 2050 |
| 202 | 1100 | 1870 | 1.5 | −13.3 | −32.0 | 2280 |
| 203 | 1100 | 1650 | 1.7 | −14.2 | −32.5 | 2170 |
| 204 | 1160 | 1700 | 1.3 | −11.8 | −31.0 | 1780 |
| 205 | 1120 | 1570 | 1.2 | 10.6 | −33.0 | 2210 |
| 206 | 1080 | 1810 | 1.2 | −14.2 | −32.5 | 2200 |
| 207 | 1100 | 2090 | 1.7 | −14.5 | −34.0 | 2090 |
| 208 | 1100 | 1850 | 1.6 | 12.1 | −33.5 | 2150 |
| *209 | 1160 | 1910 | 2.0 | −17.5 | −32.8 | 1470 |
| *210 | 1120 | 1800 | 1.3 | −21.4 | −40.5 | 2020 |
| *211 | 1120 | 1780 | 1.7 | −23.3 | −33.0 | 1450 |
| *212 | 1100 | 970 | 1.2 | −14.7 | −29.0 | 2260 |
| *213 | 1100 | 2070 | 1.7 | −23.5 | −40.6 | 2310 |
| *214 | 1140 | 1500 | 1.1 | −17.0 | −41.0 | 2010 |
| *215 | 1140 | 2000 | 1.3 | −18.5 | −31.7 | 1980 |
| *216 | 1120 | 1990 | 1.4 | −18.0 | −32.8 | 2120 |
| *217 | 1160 | 1750 | 1.7 | −19.5 | −31.5 | 2050 |
| *218 | 1160 | 1800 | 1.3 | 17.5 | −40.2 | 1830 |
| *219 | 1160 | 2150 | 1.8 | 20.0 | −33.5 | 2110 |
| *220 | | | | 1160° C. (not sintered) | | |
| 221 | 1080 | 1400 | 1.2 | 13.5 | −31.4 | 2150 |
| *222 | 1080 | 960 | 1.1 | 14.1 | −30.4 | 2140 |

*indicates out of the scope of the invention

TABLE 12

| Sample No. | baking temperature (°C.) | electronic property ε | tan δ (%) | TC (%) ΔC$_{max}$ | bias TC (%) ΔC$_{maxB}$ | mechanical property deflective strength (kg/cm²) |
| --- | --- | --- | --- | --- | --- | --- |
| 223 | 1120 | 2010 | 1.5 | −12.3 | −33.0 | 2050 |
| 224 | 1120 | 1920 | 1.6 | −12.0 | −33.3 | 2020 |
| 225 | 1120 | 2010 | 1.5 | −12.7 | −33.2 | 1990 |
| 226 | 1120 | 1980 | 1.6 | −12.5 | −33.0 | 2060 |
| 227 | 1120 | 2060 | 1.7 | −13.1 | −33.0 | 2050 |
| 228 | 1120 | 1880 | 2.0 | −12.1 | −33.0 | 1980 |
| 229 | 1120 | 1920 | 2.0 | −12.3 | −33.8 | 1960 |
| 230 | 1120 | 1940 | 2.1 | −12.5 | −33.5 | 1950 |
| 231 | 1120 | 1920 | 2.1 | −12.9 | −33.5 | 1980 |
| *232 | 1120 | 1830 | 2.8 | −11.8 | −32.2 | 1990 |

*indicates out of the scope of the invention

What is claimed is:

1. A dielectric ceramic composition composed of, 97.5 to 99.95 wt. % of main component represented by a following general formula, $\{100-(a+b+c+d)\}$ $(Ba_{100-x}Pb_x)TiO_3 + aZnO + bBi_2O_3 + cNb_2O_5 + dRe_2O_3$ (where, Re is at least one kind selected from La, Pr, Nd, Sm, Dy and Er, a, b, c, d and x designate mol. %) and are within the following ranges, $0.5 \leq a \leq 4.5$
$0.5 \leq b \leq 4.5$
$0.5 \leq c \leq 4.5$
$0.5 \leq d \leq 5.5$
$0 < x \leq 6.0$, and 0.05 to 2.5 wt. % of first by-component consisting of glass whose main component is $SiO_2$.

2. A dielectric ceramic composition composed of, 97.0 to 99.94 wt. % of main component represented by a following general formula, $\{100-(a+b+c+d)\}$ $(Ba_{100-x}Pb_x)TiO_3 + aZnO + bBi_2O_3 + cNb_2O_5 + dRe_2O_3$ (where, Re is at least one kind selected from La, Pr, Nd, Sm, Dy and Er, a, b, c, d, and x designate mol. %) and are within the following ranges, $0.5 \leq a \leq 4.5$
$0.5 \leq b \leq 4.5$
$0.5 \leq c \leq 4.5$
$0.5 \leq d \leq 5.5$
$0 < x \leq 6.0$, 0.05 to 2.5 wt. % of first by-component consisting of glass whose main component is $SiO_2$, and 0.01 to 0.5 wt. % of second by-component consisting of at least one kind selected from oxides of Cr, Mn, Fe, Co and Ni.

3. A dielectric ceramic composition composed of, 97.5 to 99.95 wt. % of main component represented by a following general formula, $\{100-(a+b+c+d+e)\}$ $BaTiO_3 + aZnO + bBi_2O_3 + cMeO_2 + dNb_2O_5 + eRe_2O_3$ (where, Me is at least one kind selected from Ti, Zr and Sn, Re is at least one kind selected from La, Pr, Nd, Sm, Dy and Er, a, b, c, d and e designate mol. %) and are within the following ranges, $0.5 \leq a \leq 4.5$
$2.0 \leq b \leq 6.0$
$0.5 \leq c \leq 6.5$
$0.5 \leq d \leq 4.5$
$0.5 \leq e \leq 5.5$, and 0.05 to 2.5 wt. % of first by-component consisting of glass whose main component is $SiO_2$.

4. A dielectric ceramic composition composed of, 97.0 to 99.94 wt. % of main component represented by a following general formula, $\{100-(a+b+c+d+e)\}$ $BaTiO_3 + aZnO + bBi_2O_3 + cMeO_2 + dNb_2O_5 + eRe_2O_3$ (where, Me is at least one kind selected from Ti, Zr, and Sn, Re is at least one kind selected from La, Pr, Nd, Sm, Dy and Er, a, b, c, d and e designate mol. %) and are within the following ranges, $0.5 \leq a \leq 4.5$
$2.0 \leq b \leq 6.0$ $0.5 \leq c \leq 6.5$ $0.5 \leq d \leq 4.5$ $0.5 \leq e \leq 5.5$, 0.05 to 2.5 wt. % of first by-component consisting of glass whose main component is $SiO_2$, and 0.01 to 0.5 wt. % second by-component consisting of at least one kind selected from oxides of Cr, Mn, Fe, Co and Ni.

5. A dielectric ceramic composition composed of, 97.5 to 99.95 wt. % of main component represented by a following general formula, $\{100-(a+b+c+d+e+f)\}BaTiO_3+aZnO+bBi_2O_3+cNb_2O_5+dMaO+eMbO_2+fRe_2O_3$ (where, Ma is at least one kind selected from Pb and Ca, Mb is at least one kind selected from Ti, Zr and Sn, Re is at least one kind selected from La, Pr, Nd, Sm, Dy and Er, a, b, c, d, e and f designate mol. %) and are within the following ranges, $0.5 \leq a \leq 4.5$ $2.0 \leq b \leq 6.0$ $0.5 \leq c \leq 4.5$ $0 < d \leq 4.0$ $6.5 \leq e \leq 10.0$ $0.5 \leq f \leq 5.5$, and 0.05 to 2.5 wt. % of first by-component consisting of glass whose main component is $SiO_2$.

6. A dielectric ceramic composition composed of, 97.0 to 99.94 wt. % of main component represented by a following general formula, $\{100-(a+b+c+d+e+f)\}BaTiO_2+aZnO+bBi_2O_3+cNb_2O_5+dMaO+eMbO_3+fRe_2O_3$ (where, Ma is at least one kind selected from Pb and Ca, Mb is at least one kind selected from Ti, Zr and Sn, Re is at least one kind selected from La, Pr, Nd, Sm, Dy and Er, a, b, c, d, e and f designate mol. %) and are within the following ranges, $0.5 \leq a \leq 4.5$ $2.0 \leq b \leq 6.0$ $0.5 \leq c \leq 4.5$ $0 < d \leq 4.0$ $6.5 \leq e \leq 10.0$ $0.5 \leq f \leq 5.5$ 0.05 to 2.5 wt. % of first by-component consisting of glass whose main component is $SiO_2$, and 0.01 to 0.5 wt. % of second by-component consisting of at least one kind selected from oxides of cr, Mn, Fe, Co and Ni.

* * * * *

UNITED STATES PATENT AND TRADEMARK OFFICE
CERTIFICATE OF CORRECTION

PATENT NO. : 5,432,136
DATED : July 11, 1995
INVENTOR(S) : Masamitsu Shibata, Yukio Hamaji, both of Nagaokakyo, Japan It is certified that error appears in the above-identified patent and that said Letters Patent is hereby corrected as shown below:

Column 2, line 28, change "within JL15%" to --within ± 15%--; and
line 37, change "+15% to 40%" to --+15% to -40%--.

Column 4, line 66, change "sheet was 19 m" to --sheet was 19 $\mu$m--.

Column 7, line 64, change "kg/cm$^2$ or less. also," to --kg/cm$^2$ or less. Also,--.

Column 9, lines 9-10, change "88.5 BatiO$_3$" to --88.5 BaTiO$_3$; and
line 59, change "Table 11, land" to --Table 11, and--.

Column 20, line 21, change "oxides of cr," to --oxides of Cr,--.

Signed and Sealed this

Seventeenth Day of February, 1998

Attest:

BRUCE LEHMAN

Attesting Officer

Commissioner of Patents and Trademarks